(12) United States Patent
Markels, Jr.

(10) Patent No.: US 7,985,267 B2
(45) Date of Patent: *Jul. 26, 2011

(54) METHOD OF PRODUCTION OF BIOFUEL FROM THE SURFACE OF THE OPEN OCEAN

(75) Inventor: Michael Markels, Jr., Camas, WA (US)

(73) Assignee: Michael Markels Jr. Revocable Trust, Camas, WA (US), Michael Markels, Jr. and Elizabeth Markels, Co-Trustees ( * ) Notice: Subject to any disclaimer, the term of this patent is extended or adjusted under 35 U.S.C. 154(b) by 161 days.

This patent is subject to a terminal disclaimer.

(21) Appl. No.: 12/356,041

(22) Filed: Jan. 19, 2009

(65) Prior Publication Data

US 2009/0119978 A1    May 14, 2009

Related U.S. Application Data

(63) Continuation-in-part of application No. 11/847,508, filed on Aug. 30, 2007, now Pat. No. 7,479,167.

(60) Provisional application No. 60/823,925, filed on Aug. 30, 2006.

(51) Int. Cl.
    *C10L 1/00* (2006.01)
(52) U.S. Cl. ........................... 44/307; 435/257.1
(58) Field of Classification Search .............. 44/307; 435/257.1
    See application file for complete search history.

(56) References Cited

U.S. PATENT DOCUMENTS

| | | | |
|---|---|---|---|
| 3,955,319 A | 5/1976 | Smith | |
| 5,010,837 A | 4/1991 | Hirose | |
| 5,269,819 A | 12/1993 | Porath | |
| 5,527,456 A | 6/1996 | Jensen | |
| 5,591,341 A | 1/1997 | Jensen | |
| 5,967,085 A | 10/1999 | Kawamura | |
| 6,056,919 A | 5/2000 | Markels | |
| 6,200,530 B1 | 3/2001 | Markels | |
| 7,080,478 B2 | 7/2006 | Levy | |
| 7,479,167 B2 * | 1/2009 | Markels, Jr. | 44/307 |
| 2001/0002983 A1 | 6/2001 | Markels, Jr. | |
| 2005/0044788 A1 * | 3/2005 | Tang et al. | 47/59 S |
| 2005/0120624 A1 | 6/2005 | Levy | |
| 2007/0048848 A1 * | 3/2007 | Sears | 435/134 |
| 2008/0124446 A1 | 5/2008 | Markels | |

OTHER PUBLICATIONS

Lewis, Leo, "Seaweed to breathe new life into fight against global warming" (TimesOnline, May 14, 2005).
Chynoweth, David P., Review of Biomethane from Marine Biomass (draft, Oct. 2002) (particularly Section 6.6 on p. 42 which is electronic p. 55 of the pdf document0 (available at www.agen.ufl.edu/~chyn/download/Publications_DC/Reports/marinefinal_FT.pdf).
Briggs, Michael, "Widescale Biodiesel Production from Algae" ("Revised 2004").
Sommerville, Chris, "Development of Cellulosic Biofuels" (appears to be 2006).
"Biofuel," Wikipedia (Aug. 5, 2008).
Kunkes, Edward L., "Catalytic Conversion of Biomass to Monofunctional Hydrocarbons and Targeted Liquid-Fuel Classes" (Sep. 18, 2008).
De Santis, Mare, "California Curents: An Exploration of the Ocean's Pleasures, Mysteries, and Dilemmas," pp. 105-105, (Aug. 1985).
Kintisch, Eli, "The Greening of Synfuels" (Apr. 18, 2009).
Kostigen, Thomas M., "How the Pacific Ocean became the world's largest dump."
Kunkes, Edward L., "Catalytic Conversion of Biomass to Monofunctional Hydrocarbons and Targeted Liquid-Fuel Classes" (Oct. 17, 2008).
Liao, James C. and Wendy Higashide, "Metabolic Engineering of Next-Generation Biofuels".
Ritter, Stephen K., "On the Road to Green Gasoline: Leveraging Carbohydrate-to-Hydrocarbon chemistry to give transportation fuel supplies a lift" (Nov. 17, 2008).
Ritter, Stephen K., "Genes to Gasoline: Genomics strategies provide clues for Unraveling Cellulosic Biomass" (Dec. 8, 2008).
USDA, "Plant Fact Sheet: Switchgrass" (May 24, 2006).
"Panicum virgatum (Switchgrass)," Wikipedia.

* cited by examiner

*Primary Examiner* — Cephia D Toomer
(74) *Attorney, Agent, or Firm* — Bacon & Thomas, PLLC

(57) ABSTRACT

A method for the production of biofuels from the open ocean comprises the steps: testing the currents to determine that a biomass remains in a zone suitable for harvesting; harvesting a portion of the biomass; and processing a portion of the harvested biomass to produce useful components of biofuels. An improved method of production of a biofuel comprises the additional steps of testing the ocean surface waters to determine any nutrients that are missing, and applying a fertilizer with any missing nutrients. The currents should be such that the biomass created stays in the ocean waters suitable for harvest rather than washed up on shores, or dispersed to other areas of the ocean. Suitable currents include ocean gyres such as the Sargasso Sea. Suitable biomass includes seaweeds that float in the open ocean and aggregate together in floating patches, such as the Sargassum weed in the Sargasso Sea.

18 Claims, No Drawings

METHOD OF PRODUCTION OF BIOFUEL FROM THE SURFACE OF THE OPEN OCEAN

This application claims the benefit of provisional application No. 60/823,925 filed Aug. 30, 2006. This application is a continuation-in-part of application Ser. No. 11/847,508 filed Aug. 30, 2007.

BACKGROUND OF THE INVENTION

The field of the invention is the production of bio-diesel or other synthetic biofuels from harvesting biomass from the open ocean. The production of biomass through agriculture on land is well known, including the growing of corn, which can then be converted to ethanol for addition to gasoline (gasohol). This is energy intensive and high cost, only being economically effective with crude oil at over $70 a barrel and is enhanced by tax advantages. Another difficulty is that there is not enough suitable land to make a significant impact on the crude oil consumption of the U.S. Only about 16% of the earth's surface is available for agriculture whereas 72% is open ocean. We have increased the productivity of the 16% by about 2000 times since we were hunter-gatherers, but in the ocean we are still hunter-gatherers. About 60% of the plant life that grows in the ocean arises from 2% of the ocean surface, an area around the edges of the continents and large islands. That leaves 40% to grow from the 98% of the open ocean away from land. If we could make some portion of that 98% more like the 2% we could greatly increase the fish production, sequester $CO_2$ to the deep ocean or produce biomass for conversion to biofuel. The burning of this biofuel would not increase the $CO_2$ content of the atmosphere since the carbon comes from the atmosphere through photosynthesis in the ocean.

The production of biomass in the open ocean can be enhanced by the addition of fertilizing elements to the ocean surface to produce more seafood catch. See the following U.S. patents:

| | |
|---|---|
| Method of Improving Production of Seafood | U.S. Pat. No. 5,433,173 |
| Method of Increasing Production of Seafood in the Ocean | U.S. Pat. No. 5,535,701 |
| Method of Increasing Seafood Production in the Barren Ocean | U.S. Pat. No. 5,967,087 |
| Method of Increasing Seafood Production in the Barren Ocean with a Fertilizer Comprising Chelated Iron | U.S. Pat. No. 6,408,792 B1 |
| Method of Increasing the Fish Catch in the Ocean | U.S. Pat. No. 6,729,063 B1 |

Since fish and zooplankton recycle $CO_2$ to the ocean surface the fertilization should be done to minimize this loss of biomass in order to sequester $CO_2$ in the deep ocean. See the following U.S. patents:

| | |
|---|---|
| Method of Sequestering Carbon Dioxide | U.S. Pat. No. 6,056,919 |
| Method of Sequestering $CO_2$ with Spiral Fertilization | U.S. Pat. No. 6,200,530 |
| Method of Sequestering Carbon Dioxide with a Fertilizer Comprising Chelated Iron | U.S. Pat. No. 6,440,367 |

The ocean currents and diffusion will gradually disburse the biomass created, which is generally in single cells and small aggregates. Therefore areas of the ocean surface must be found that keep the biomass created in a confined area and in a form suitable for harvesting. Once the biomass is harvested it must be processed to form components that are suitable for blending to make biofuels.

SUMMARY OF THE INVENTION

A method for the production of components of biofuels from the open ocean comprises the following steps: (1) testing the currents to determine that a biomass remains in a zone suitable for harvesting; (2) harvesting a portion of the biomass; and (3) processing a portion of the harvested biomass to produce useful components of biofuels. The currents should be such that the biomass created stays in the ocean waters suitable for harvest rather than washed up on shores, or dispersed to other areas of the ocean. Such currents that confine biomass for many years are ocean gyres such as the Sargasso Sea of the North Atlantic, which is unique since it is large, over 2,000,000 sq mi, and does not have any shore line boundaries. Other converging tropical gyres may also be of use. Plant life may be suitable biomass. Seaweeds may be suitable plant life. As suitable seaweeds grow in the open ocean they float and aggregate together in the form of loose floating patches as does the Sargassum weed in the Sargasso Sea. This is an ideal form for harvesting using a powered rake to bring the biomass over the bow of the harvesting vessel. The biomass can then be dried and compressed in the vessel hold for shipment back to port for processing to obtain biofuel components. It may also be possible to separate seeds or buds from the seaweed and with suitable fertilizer elements add them back into the ocean water to enhance the next harvest. The harvested biomass is transferred to port for processing into biofuel components. This is similar to what takes place in converting biomass from plant material grown on land but with a different plant source. The same conversion technology applies that results in components for biofuels such as ethanol and bio-oils. The Sargasso Sea should be ideal for this purpose. Other ocean areas, perhaps with greater leakage at the edges must be carefully studied to ascertain the best locations for harvest.

An improved method for the production of components of biofuels from the open ocean comprises the following steps: (1) testing the currents to determine that any biomass produced remains in a zone suitable for harvesting; (2) testing the ocean water surface to determine the nutrients that are missing or too low concentration; (3) testing the ocean surface to determine the concentration of plant life in a form suitable for harvesting (this plant life, if missing to any significant extent, can be added to the ocean surface to enhance the harvest of suitable plant life over time); (4) adding a fertilizer that releases an appropriate amount of these nutrients over time in a form that remains available to the plant life (for example, the nutrients should not leave the photic zone by precipitation to any appreciable extent) in the photic zone; (5) harvesting the plant life produced by the fertilization; and (6) processing the harvested plant life to produce useful components of biofuels.

The testing of the ocean surface water may be carried out by any number of methods that are known to one of ordinary skill in the art, in order to ascertain the nutrients that are missing to a significant extent. A nutrient is missing to a significant extent if the production of biomass is limited to a significant extent by the level of the nutrient in the water. An appropriate amount of a missing nutrient is an amount to raise the concentration of the nutrient in the ocean surface so that the production of biomass is no longer limited to a significant extent by the concentration of the nutrient.

The fertilization of the open ocean to increase biomass production may be carried out with a fertilizer system that comprises one or more fertilizers and suitable plant systems. The suitable plant system will generally require a fertilizer comprising iron, phosphate and nitrate and will be in the form of seaweed rather than diatoms so that it can be harvested easily from the ocean water. The currents should be such that the biomass created stays in the ocean waters suitable for harvest rather than washed up on shores. Such currents that confine biomass for many years are ocean gyres such as the Sargasso Sea, which is unique since it is large, over 2,000,000 sq mi, and does not have any shore line boundaries. Other converging tropical gyres may also be of use, such as the North Pacific Ocean. The fertilizer may contain iron to enhance chlorophyll production, phosphate to enhance biomass and nitrate to enhance growth. If the plant life already there does not produce enough nitrate, this may be added, or Trichodesmium may be added to help to produce the nitrate along with the plant life there. The iron must be added in a form that does not precipitate to any significant extent, especially if phosphate is also required. This can be done by adding the iron in the form of a chelate such as lignin acid sulphonate. The iron and the phosphate can be added in the form of slow release pellets that minimize the chemical reactions between the fertilizers by minimizing their concentration in the ocean water of the fertilization patch.

As the seaweeds grow in the open ocean they float and aggregate together in the form of loose floating patches as does the Sargassum weed in the Sargasso Sea. This is an ideal form for harvesting using a powered rake to bring the biomass over the bow of the harvesting vessel. The biomass can then be dried and compressed in the vessel hold for shipment back to port for processing to obtain biofuel components. Since the harvesting vessel has just removed biomass from the ocean it is an excellent vehicle to disburse the required fertilizing elements into the ocean surface. It may also be possible to separate seeds or buds from the seaweed and add them back into the ocean water with the fertilizer to enhance the next harvest.

The harvested biomass is transferred to port for processing into biofuel components. This is similar to what takes place in converting biomass from plant material grown on land but with a different plant source. The same conversion technology applies that results in components for biofuels such as ethanol and bio-oils. Since the area for fertilization has been selected for long term residence of the biomass created, such as the Sargasso Sea, the fertilization can be carried out using a long term pattern. The area of the Sargasso Sea is approximately 2,000,000 sq mi and should be ideal for this purpose. Other similar ocean areas with greater leakage at the edges must be carefully studied to ascertain the best location for fertilization and harvest.

DETAILED DESCRIPTION OF THE INVENTION

The production of biofuel from the fertilization of the ocean surface would greatly increase the biofuels available to the U.S., reducing the nation's reliance on imported crude oil. In order to do this economically the biomass created must be suitable for efficient harvest. The phytoplankton normally produced by ocean fertilization (see referenced patents) are so small, 1-20 ηm diameter, that they cannot be separated from the water in large tonnages efficiently. Therefore a larger biomass plant must be grown such as seaweed. Seaweeds, like larger terrestrial plants are usually anchored to the ground with hold-fast root systems. This protects them from drifting with the currents to less hospitable areas such as sandy beaches and rocky shores. The Sargasso Sea weed is unique in that it is not anchored by roots and can drift with the currents. However, the currents must be such that they keep the Sargassum weed confined to an enclosed sea away from shore with minimum leakage. The Sargasso Sea, with an area of about 2,000,000 sq mi has no continental shores and has a low leakage rate for the enclosed Sargassum weeds. There may be other areas of the world's oceans that also have suitable long residence time for floating seaweeds and/or other plant life in the water that will be revealed by further study.

The Sargassum weed grows in an area of the North Atlantic bounded by the Gulf Stream on the west. The Corriolis force turns this current to the east where the force further turns it to the south off the coast of Europe. This current then turns to the west across the south Atlantic to join the Gulf Stream, completing the entrapment of the North Atlantic Ocean surface water that forms the Sargasso Sea. The Sargassum weed is the same family of seaweed that grows along the shores of the Atlantic Ocean but has lost its ability to grow roots, allowing it to float with the current and form mats on the ocean surface. The current curves to the right as it circulates slowly moving to the center of the Sargasso Sea where it forms a low hump and slowly sinks through the thermocline. The long-lived weed soon uses up the fertilizing elements in the surface water restricting its growth. However, the weed has developed the ability to use up the iron that is blown into the Sargasso Sea as dust from the Sahara Desert in Africa and also uses up the dissolved phosphate in the water. The weed then uses the refactory organic phosphate to maintain growth while recycling the iron as chlorophyll. The addition of soluble iron as lignin acid sulphonate and the addition of soluble ammonium phosphate should increase the growth rate of the Sargassum weed by 10 to 100 times. The ambient nitrogen-fixing phytoplankton in the area should be able to satisfy the nitrate required but if this is found not to be the case additional nitrogen fixers, such as Trichodesmium can be added to maintain growth. There are few fish in the Sargasso Sea, only a few small crabs and crustaceans in the Sargassum weed.

The maximum growth rate of the Sargassum weed attainable with fertilization is not accurately known, but has been shown to reach 2 ft/day under optimal conditions. Other species of brown algae are fast growers, as fast as high-yield agricultural plants such as beans and grains. On land we grow sugar cane, which produces about 25,000 tons of biomass per sq mi per year. We estimate that in the Sargasso Sea we could produce as much as 10,000 tons of biomass per sq mi per year of which 5,000 tons could be converted into biofuel components. The Sargasso Sea is about 2000 miles long, east to west, and 1000 miles north to south, for a total area of about 2,000,000 sq mi. If we could fertilize 20% of this we would have 400,000 sq mi. This area, with a 50% conversion rate, times 5000 tons per sq mi per year gives a total of about 1,000,000,000 tons of biofuel per year. At 350 lbs per barrel (5.7 barrels/ton) this gives 5,700,000,000 barrels per year of biofuel. The current U.S. crude consumption is about 7,700,000,000 barrels/year and the world demand is about 31,000,000,000 barrels/year. This indicates the possibility that the Sargasso Sea project could supply about 74% of the U.S. annual demand for oil and biofuel components. The Sargassum weed, itself, as well as by-products of the biofuel component processing could also be used for cattle fodder and other purposes. There may be other ocean areas that can also be brought into production. The North Pacific Ocean has a similar gyre, a clockwise-rotating area that does not contain Sargassum Weed but does float large amounts of trash and may be an area available to grow the Sargassum Weed as well.

There may be many difficulties to bringing about the indicated production. Perhaps the greatest difficulty is the institution of private property rights in the open ocean far from land. This is required if the investment of fertilization can result in the harvesting of the Sargassum weed as required for a robust long-term commercialization of this fuel source. The long term advantage to the U.S. and the world, which will gain from the lowering of the $CO_2$ concentration of the atmosphere by the application of this technology, will provide the necessary impetus for the privatization of the open ocean required. This can be done by maintaining the free access now enjoyed but restricting the harvesting of the Sargassum weed for the production of biofuels produced by fertilization.

Should it be determined that a significant portion of the biomass produced cannot be harvested but is sequestered in the deep ocean as described in the referenced patents, then measurements of the amount of $CO_2$ sequestered can be made and carbon sequestration credits can be claimed as covered by those patents. Likewise, if fish are caught inadvertently by the harvesting operation, any commercialization of their biomass can be claimed by the holders of the referenced patents for increased fish production. Each of these inadvertent results is expected to be small.

The cost of fertilization is expected to be low resulting in the increased production of biomass in the fertilized area, which is equal to the harvested biomass plus the increase in biomass left behind after the harvest The total biomass is expected to be about $2\times10^9$ tons/yr (about $1.2\times10^9$ tons C). This will require about $1.3\times10^6$ tons/yr of chelated iron (at 12% Fe) and about $25\times10^6$ tons of ammonium phosphate per year. Note that the Redfield ratios are increased by about a factor of 8 for phosphate and a factor of 4 for iron. As noted, extra iron and phosphorous will be added to assure continued growth of the Sargassum weed after the harvesting.

These estimates of return from fertilizing will be changed by measurements at the site and the amounts measured there. They do, however, give an indication of the capacity of the Sargasso Sea and perhaps other ocean gyres to produce biomass for biofuel production.

The other costs include the ship time for the spreading of the fertilizers and the harvesting of the biomass, the processing of the biomass to biofuel components, the blending to obtain fuels for internal combustion engines (such as bio diesel) and the sale of these fuel blends. The cost of these activities is small in comparison with the expected value of $5.7\times10^9$ barrels of biofuel, which, at $42/barrel, should be worth $240\times10^9$ per year.

The processing of the Sargassum Weed to biofuels follows the processing routes of other cellulosic raw materials such as switch grass, corn stover and wood chips. The Sargassum Weed is 5% protein and 95% cellulose and can be converted into biofuels using catalytic conversion or syngas. These methods are more all-encompassing, that is, can be used to process a variety of fuel stocks, and more productive than is ethanol produced by yeast fermentation.

The cellulosic portion of the Sargassum Weed may also be degraded by using biochemical technology into starches, sugars and oils that may used to produce ethanol, gasoline, jet fuel and diesel fuel. The lignocellulose in the cell walls may be degraded into its sugar building blocks. For example, *Trichoderma reesei* is a fungus that was found during World War II to degrade cotton military uniforms and canvas tents in the South Pacific. Another example is *Clostridium thermocellum* which is a soil bacterium that degrades cellulose and then ferments the glucose into ethanol. In some processes, the cellulosic material may be ground and treated with dilute sulfuric acid as a pretreatment, before applying a source of degrading enzymes such as a fungus or a bacterium, or applying a mixture of cellulase and xylanase enzymes. It is possible that genetic modification of the Sargassum Weed may lead to a modified weed that is more easily degraded. Biochemical technology may be more efficient than other technologies such as a gasification which uses extreme heat to prepare synthesis gas (carbon monoxide and hydrogen) that can be converted into hydrocarbon fuels, or pyrolysis which uses less heat than gasification.

Variations of the invention may be envisioned by those skilled in the art and the invention is to be limited solely by the claims hereto.

I claim:

1. A method of producing biofuel from the surface of the ocean waters comprising the following steps:
    (1) testing a water surface of an ocean to determine a time period that said water will remain for a biofuel generation;
    (2) testing said water surface to determine a first nutrient that is missing to a first extent that limits the growth of a first plant life;
    (3) applying said first missing nutrient in a form that remains available to said first plant life;
    (4) harvesting a first harvested portion of an increased biomass of said first plant life that results from said applying;
    (5) removing a first returnable portion from said first harvested portion to leave a remainder of said first harvested portion, and spreading said first returnable portion on said water surface; and
    (6) processing said remainder of said first harvested portion into a biofuel component.

2. The method of claim 1, further comprising the additional step of blending said biofuel component into a bio-diesel liquid.

3. The method of claim 1, wherein said first plant life comprises a Sargassum weed.

4. The method of claim 1, wherein said first returnable portion comprises a plurality of seeds for said Sargassum weed.

5. The method of claim 1, wherein said first returnable portion comprises a plurality of buds for said Sargassum weed.

6. The method of claim 1, wherein said first plant life comprises a floating weed.

7. The method of claim 1, wherein said first missing nutrient in a form that remains available to said first plant life, comprises a member selected from the group consisting of iron in the form of a chelate, a soluble phosphate, a nitrate, and mixtures of one or more of the said members.

8. A biofuel comprising a biofuel component that is produced by the method of claim 1.

9. A method of producing biofuel from the surface of the ocean waters comprising the following steps:
    (1) adding a floating weed, buds and seeds to an ocean to induce the bloom of the weed or another required plant life;
    (2) applying a first nutrient to a water surface of an ocean, and thereby producing an increased biomass of a first plant life;
    (3) harvesting a first harvested portion of said increased biomass;
    (4) processing said first harvested portion into a biofuel component.

10. The method of claim 9, wherein said first plant life comprises a floating weed.

11. The method of claim 9, wherein said first plant life comprises a Sargassum weed, and said first nutrient comprises iron in the form of a chelate.

12. The method of claim 9, further comprising the additional step of blending said biofuel component into a biofuel.

13. The method of claim 9, wherein said processing produces a biofuel component residual, and further comprising the additional step of blending said biofuel component residual into a cattle fodder, or other useful raw material.

14. A method of producing biofuel from the surface of the ocean waters comprising the following steps:
    (1) testing a water surface of an ocean to determine a time period that a first biomass in said water will remain for a biofuel generation;
    (2) harvesting a first harvested portion of said first biomass; and
    (3) processing said first harvested portion into a biofuel component.

15. The method of claim 14, further comprising the additional step of blending said biofuel component into a biodiesel liquid.

16. A biofuel comprising a biofuel component that is produced by the method of claim 14.

17. The method of claim 14, wherein said processing produces a first biofuel component residual.

18. A method of producing biofuel from the surface of the ocean waters comprising the following steps:
    (1) applying a first nutrient to a water surface of an ocean, and thereby producing an increased biomass of a first plant life;
    (2) harvesting a first harvested portion of said increased biomass;
    (3) processing said first harvested portion into a biofuel component.

* * * * *